US012436432B2

(12) United States Patent
Shi

(10) Patent No.: US 12,436,432 B2
(45) Date of Patent: Oct. 7, 2025

(54) ARRAY SUBSTRATE AND LIQUID CRYSTAL DISPLAY PANEL

(71) Applicant: Guangzhou China Star Optoelectronics Semiconductor Display Technology Co., LTd., Guangdong (CN)

(72) Inventor: Haosen Shi, Guangdong (CN)

(73) Assignee: Guangzhou China Star Optoelectronics Semiconductor Display Technology Co., LTd., Guangzhou (CN)

( * ) Notice: Subject to any disclaimer, the term of this patent is extended or adjusted under 35 U.S.C. 154(b) by 0 days.

(21) Appl. No.: 18/509,335

(22) Filed: Nov. 15, 2023

(65) Prior Publication Data

US 2024/0332314 A1 Oct. 3, 2024

(30) Foreign Application Priority Data

Mar. 28, 2023 (CN) .......................... 202310318885.9

(51) Int. Cl.
*G02F 1/1343* (2006.01)
*G02F 1/1362* (2006.01)

(52) U.S. Cl.
CPC .. *G02F 1/134372* (2021.01); *G02F 1/136227* (2013.01); *G02F 1/136286* (2013.01)

(58) Field of Classification Search
CPC .............. G02F 1/1362; G02F 1/134372; G02F 1/136227; G02F 1/136286
See application file for complete search history.

(56) References Cited

U.S. PATENT DOCUMENTS

| | | | | |
|---|---|---|---|---|
| 2016/0322805 A1* | 11/2016 | Franke | ................. | H02H 3/0935 |
| 2020/0301223 A1* | 9/2020 | Xu | ..................... | G02F 1/136286 |
| 2023/0087495 A1* | 3/2023 | Cheng | ................. | G02F 1/13338 |
| | | | | 349/41 |

FOREIGN PATENT DOCUMENTS

| | | | | |
|---|---|---|---|---|
| CN | 108732835 | * | 11/2018 | ........... G02F 1/1362 |
| KR | 101818457 | * | 12/2012 | ........... G02F 1/1343 |

* cited by examiner

*Primary Examiner* — Jia X Pan
(74) *Attorney, Agent, or Firm* — PV IP PC; Wei Te Chung

(57) ABSTRACT

An array substrate includes a substrate, a common electrode line, a gate insulation layer, a common electrode, a first passivation layer, and a pixel electrode layer that are stacked in sequence. The pixel electrode layer includes a pixel electrode and a bridge electrode insulated from the pixel electrode. A first through hole is opened in the common electrode, a second through hole is opened in the first passivation layer, a third through hole is opened in the gate insulation layer, the third through hole exposes the common electrode line, an orthographic projection of a hole wall of the first through hole on the substrate is a first orthographic projection, an orthographic projection of a hole wall of the second through hole on the substrate is a second orthographic projection, and the first orthographic projection partially overlaps the second orthographic projection.

10 Claims, 8 Drawing Sheets

ARRAY SUBSTRATE AND LIQUID CRYSTAL DISPLAY PANEL

CROSS REFERENCE TO RELATED APPLICATIONS

The present application claims priority to Chinese Patent Application No. 202310318885.9, filed on Mar. 28, 2023, and entitled "ARRAY SUBSTRATE AND LIQUID CRYSTAL DISPLAY PANEL". The entire disclosures of the above application are incorporated herein by reference.

TECHNICAL FIELD

The present application relates to the field of display technology, in particular to an array substrate and a liquid crystal display panel.

BACKGROUND

Fringe Field Switching (FFS) liquid crystal display panels or In-Plane Switching (IPS) liquid crystal display panels control a rotation of liquid crystal molecules in a plane to achieve image display. A known FFS type liquid crystal display panel uses a 5mask (mask) architecture as shown in FIG. 1. The 5mask architecture includes a substrate S, a common electrode CL, a gate insulation layer GI, a first passivation layer PV1, a common electrode CITO, a second passivation layer PV2, and a pixel electrode layer PITO that are sequentially stacked on the substrate S. A first metal layer M1 is a layer where a gate signal is located. A function of the gate insulation layer GI is to isolate the first metal layer M1 and a second metal layer M2. The second metal layer M2 is a layer where a data signal is located. The first passivation layer PV1 functions to isolate the first metal layer M1 from the common electrode layer CITO. A function of the second passivation layer PV2 is to isolate the common electrode layer CITO and the pixel electrode layer PITO. However, in this 5mask architecture, the pixel electrode layer PITO needs to be used to bridge the first metal layer M1 and the common electrode layer CITO to stabilize a pixel voltage.

The pixel electrode layer PITO of the 5mask architecture is located at a top of a pixel, and its manufacturing step is a last step of the pixel manufacturing process. In addition, the common electrode layer CITO is located in the middle, that is, below the second passivation layer PV2. The main advantages of this process may include: First, the position of the common electrode layer C-ITO and the pixel electrode layer PITO is closer, which reduces a torque of an electric field between two electrode layers, which is more conducive to a rotation of liquid crystal. This reduces a voltage value (Vop) at which the pixel reaches a maximum brightness, which helps reduce power consumption. Second, a non-halftone mask process can be used to reduce a distance between a gate and a drain and a distance between the pixel electrode and the drain in the pixel, which is beneficial to narrowing a width of a black matrix and thereby increasing a pixel aperture ratio. However, the 5mask architecture brings the entire pixel thickness to 13000 A. A deep hole connecting the first metal layer M1 and the pixel electrode layer PITO needs to penetrate the second passivation layer PV2, the first passivation layer PV1, and the gate insulation layer GI in a photomask process. The manufacturing of the deep hole is difficult. If the deep hole cannot be successfully formed, the first metal layer M1 and the pixel electrode layer PITO cannot be connected, resulting in poor connection.

SUMMARY

In view of this, the present application provides an array substrate and a liquid crystal display panel that can improve a success rate of forming deep holes.

The present application provides an array substrate comprising a substrate; a common electrode line disposed on the substrate; a gate insulation layer disposed on the common electrode line; a first passivation layer disposed on the gate insulation layer; a common electrode disposed on the first passivation layer; a second passivation layer disposed on the common electrode; and a pixel electrode layer disposed on the second passivation layer.

The pixel electrode layer comprises a pixel electrode and a bridge electrode insulated from the pixel electrode, a first through hole is opened in the common electrode, a second through hole is opened in the first passivation layer, a third through hole is opened in the gate insulation layer, the third through hole exposes the common electrode line, an orthographic projection of a hole wall of the first through hole on the substrate is a first orthographic projection, an orthographic projection of a hole wall of the second through hole on the substrate is a second orthographic projection, the first orthographic projection partially overlaps the second orthographic projection, the first through hole, the second through hole, and the third through hole are connected with each other, and the bridge electrode extends into the first through hole, the second through hole, and the third through hole to connect with the common electrode and the common electrode line.

Optionally, a length direction of the second orthographic projection is defined as the first direction, a direction perpendicular to the first direction is defined as the second direction, and in the first direction and/or the second direction, at least one end of the second orthographic projection is located outside the first orthographic projection.

Optionally, a length direction of the second orthographic projection is defined as the first direction, a direction perpendicular to the first direction is defined as the second direction, and in the first direction and/or the second direction, at least one end of the first orthographic projection is located outside the second orthographic projection.

Optionally, a length direction of the second orthographic projection is defined as the first direction, a direction perpendicular to the first direction is defined as the second direction, and in the first direction and/or the second direction, at least one end of the second orthographic projection is located outside the first orthographic projection; and
   in the first direction and/or the second direction, at least one end of the first orthographic projection is located outside the second orthographic projection.

Optionally, in the second direction, both ends of the second orthographic projection are located outside the first orthographic projection; and
   in the first direction, both ends of the first orthographic projection are located outside the second orthographic projection.

Optionally, in the second direction, one end of the second orthographic projection is located outside the first orthographic projection, and another end of the second orthographic projection is located inside the first orthographic projection; and in the first direction, both ends of the first orthographic projection are located outside the second orthographic projection.

Optionally, the array substrate further comprises a metal pad, the metal pad is disposed between the common electrode line and the common electrode, in the first direction and/or the second direction, an orthographic projection of the metal pad on the substrate extends from outside the first orthographic projection to between the first orthographic projection and the second orthographic projection.

Optionally, the first direction is an extension direction of the common electrode line.

Optionally, the first through hole and the second through hole are respectively rectangular or rounded rectangular, a length direction of the first through hole is one of the first direction and the second direction, and a length direction of the second through hole is another one of the first direction and the second direction.

Optionally, in the first direction and/or the second direction, the first passivation layer covers the common electrode.

Optionally, in the first direction and/or the second direction, the first through hole exposes the common electrode.

The present application further provides a liquid crystal display panel, which includes the array substrate as described above.

According to the array substrate and the liquid crystal display panel of the present application, before patterning of the first passivation layer, first, the common electrode is patterned to form a first through hole, and the first through hole partially overlaps with the second through hole. Because there is no common electrode barrier in a part where the second through hole overlaps the first through hole, the first passivation layer can be etched simultaneously to the underlying gate insulation layer. Thereby, the success rate of deep hole formation is improved, and the common electrode is exposed in the part where the second through hole does not overlap with the first through hole, so that the bridge part is connected to the exposed electrode and thereby connected to the common electrode line.

BRIEF DESCRIPTION OF THE DRAWINGS

In order to illustrate the technical solutions more clearly in the embodiments of the present application, the following briefly introduces the drawings that need to be used in the description of the embodiments. Obviously, the drawings in the following description are only some embodiments of the present application. For those skilled in the art, other drawings can also be obtained based on these drawings without any creative effort.

DETAILED DESCRIPTION OF ILLUSTRATED EMBODIMENTS

The technical solutions in the present application will be clearly and completely described below with reference to the accompanying drawings in the embodiments of the present application. Obviously, the described embodiments are only some of the embodiments of the present application, but not all of the embodiments. Based on the embodiments in the present application, all other embodiments obtained by those skilled in the art without creative efforts fall within the scope of protection of the present application.

In the present application, unless otherwise expressly stated and limited, a first feature "on" or "below" a second feature may include the first and second features directly, and it may also be included that the first and second features are not directly connected but are in contact through another feature between them. Furthermore, the first feature "on", "above", and "over" the second feature includes the first feature directly above and diagonally above the second feature, or it simply means that the first feature has a higher level than the second feature. The first feature "below", "under", and "beneath" the second feature includes the first feature being directly below and diagonally below the second feature, or it simply means that the first feature has a smaller horizontal height than the second feature. In addition, the terms "first" and "second" are used for descriptive purposes only and cannot be understood as indicating or implying relative importance or implicitly indicating the quantity of indicated technical features. Therefore, the features defined as "first" and "second" may explicitly or implicitly include one or more features.

Figure 1:
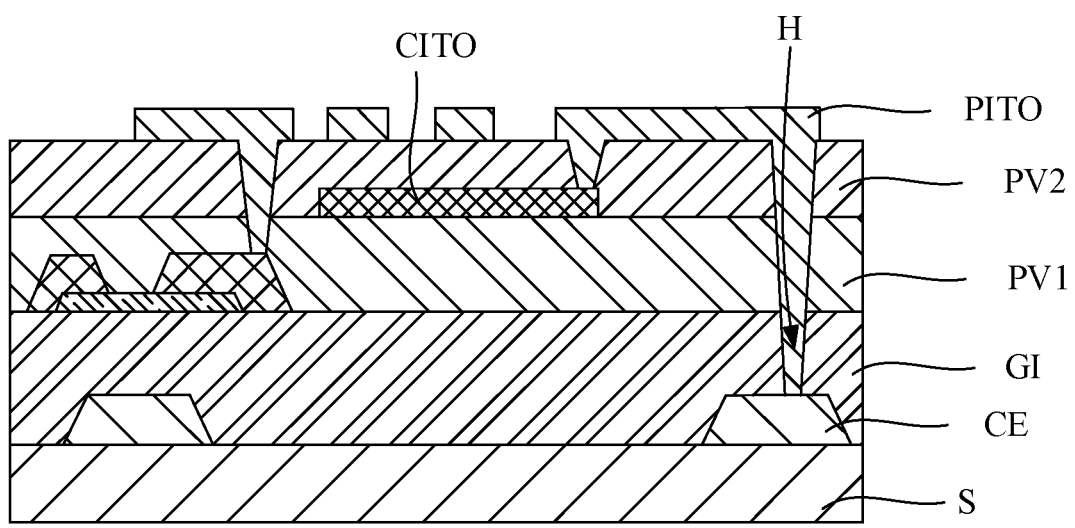
FIG. 1 is a schematic structural diagram of a known 5mask architecture.

While researching the difficulty of manufacturing deep holes in the 5mask architecture, the inventor discovers that: in the 5mask architecture of FIG. 1, a bridge hole H used to bridge a common electrode line CL and a common electrode CITO is formed by patterning a second passivation layer PV2, a first passivation layer PV1, and a gate insulation layer GI through a photomask process. Because there is a common electrode CITO under the second passivation layer PV2 at the bridge hole H, material of the common electrode CITO is a transparent conductive material. The second passivation layer PV2, the first passivation layer PV1, and the gate insulation layer GI are inorganic materials, and etching methods of transparent conductive materials and inorganic materials are different. The common electrode CITO below the second passivation layer PV2 blocks the etching of the first passivation layer PV1 and the gate insulation layer GI while etching the second passivation layer PV2. This results in the failure of deep hole formation. If the upper bridge electrode is offset during deposition, the bridge may fail.

The present application provides an array substrate and a liquid crystal display panel using the array substrate. The array substrate includes a substrate, a common electrode line disposed on the substrate, a gate insulation layer disposed on the common electrode line, a first passivation layer disposed on the gate insulation layer, a common electrode disposed on the first passivation layer, a second passivation layer disposed on the common electrode, and a pixel electrode layer disposed on the second passivation layer. The pixel electrode layer comprises a pixel electrode and a bridge electrode insulated from the pixel electrode, a first through hole is opened in the common electrode, a second through hole is opened in the first passivation layer, a third through hole is opened in the gate insulation layer, the third through hole exposes the common electrode line, an orthographic projection of a hole wall of the first through hole on the substrate is a first orthographic projection, an orthographic projection of a hole wall of the second through hole on the substrate is a second orthographic projection, the first orthographic projection partially overlaps the second orthographic projection, the first through hole, the second through hole, and the third through hole are connected with each other, and the bridge electrode extends into the first through hole, the second through hole, and the third through hole to connect with the common electrode and the common electrode line.

Before patterning of the first passivation layer according to the present application, first, the common electrode is patterned to form a first through hole, and the first through hole partially overlaps with the second through hole. Because there is no common electrode barrier in a part where the second through hole overlaps the first through hole, the first passivation layer can be etched simultaneously to the underlying gate insulation layer. Thereby, the success rate of deep hole formation is improved, and the common electrode is exposed in the part where the second through hole does not overlap with the first through hole, so that the bridge part is connected to the exposed electrode and thereby connected to the common electrode line.

Hereinafter, specific embodiments of the present application will be described with reference to the accompanying drawings.

Figure 2:
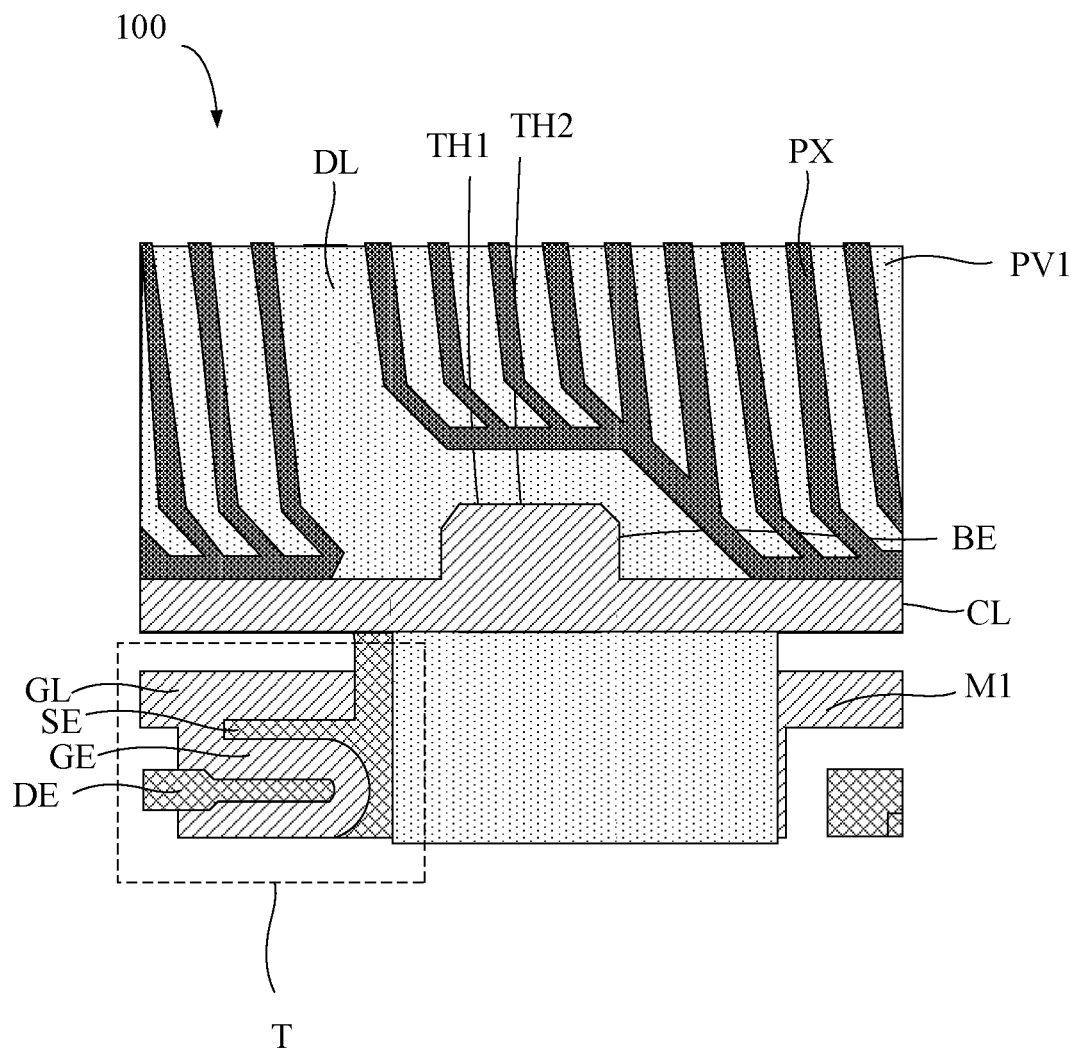
FIG. 2 is a top view of an array substrate according to an embodiment of the present application.
Figure 3A:
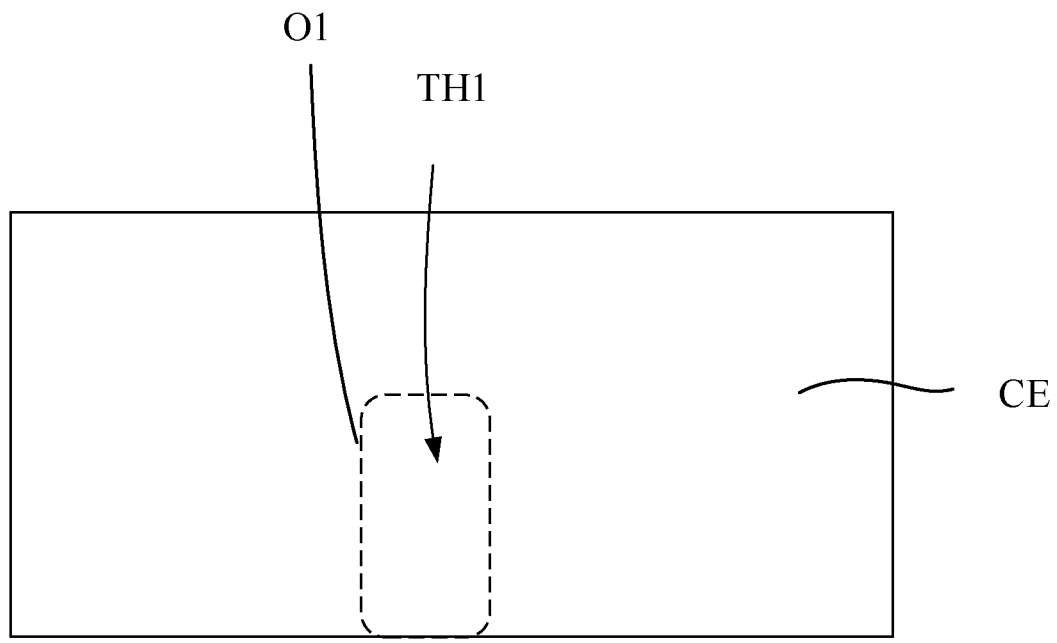
FIG. 3A is a schematic diagram of a first through hole of a common electrode layer in an array substrate of FIG. 2.
Figure 3B:
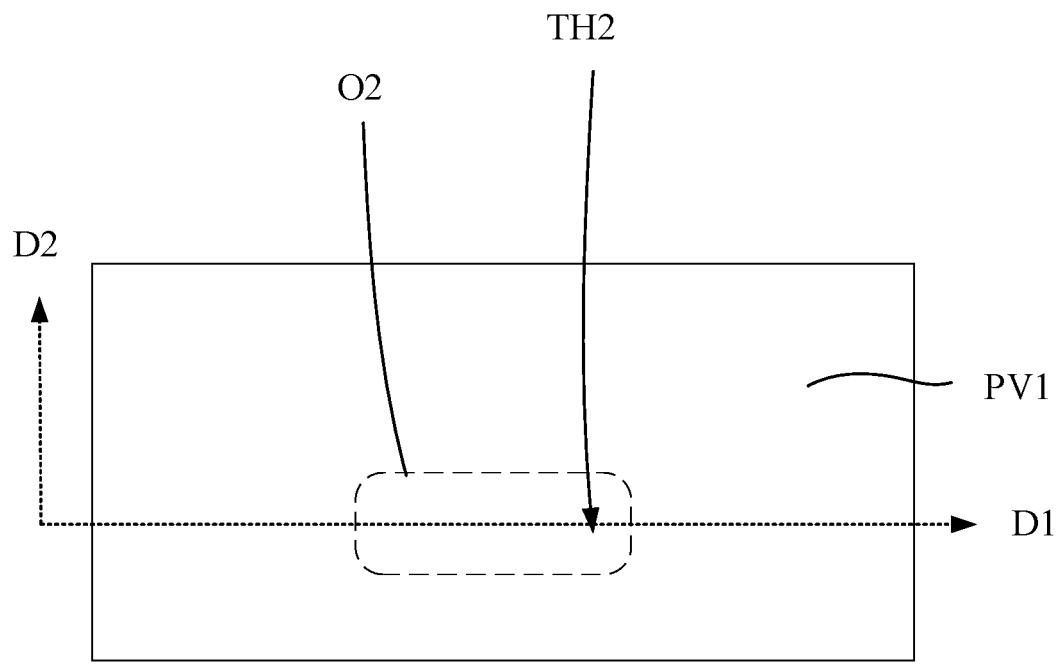
FIG. 3B is a schematic diagram of a second through hole of a first passivation layer in the array substrate of FIG. 2.
Figure 3C:
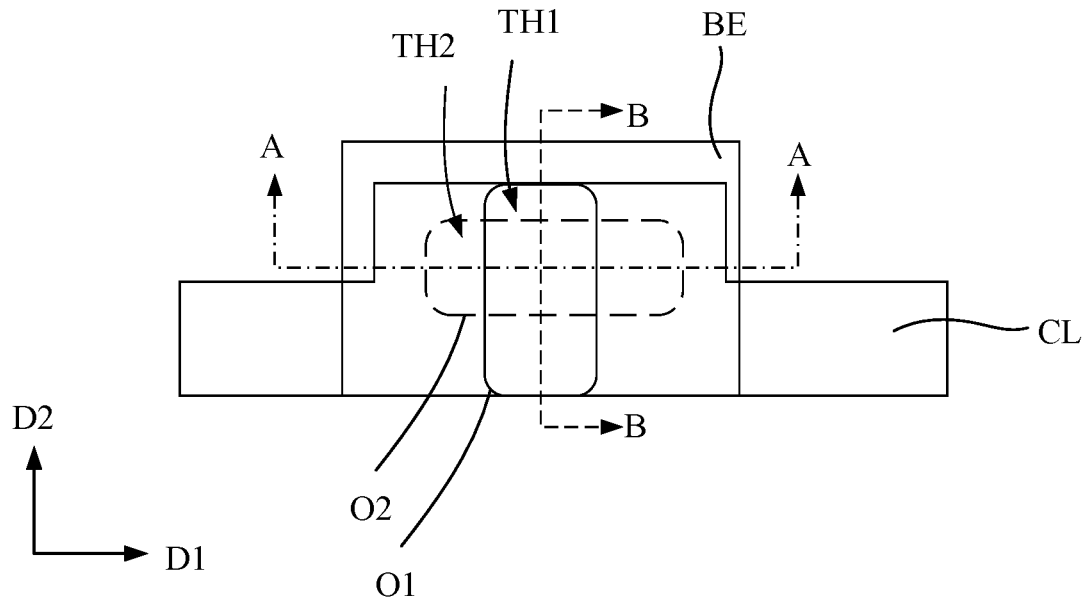
FIG. 3C is a schematic top view of the first through hole and the second through hole in FIG. 3A and FIG. 3B.
Figure 3D:
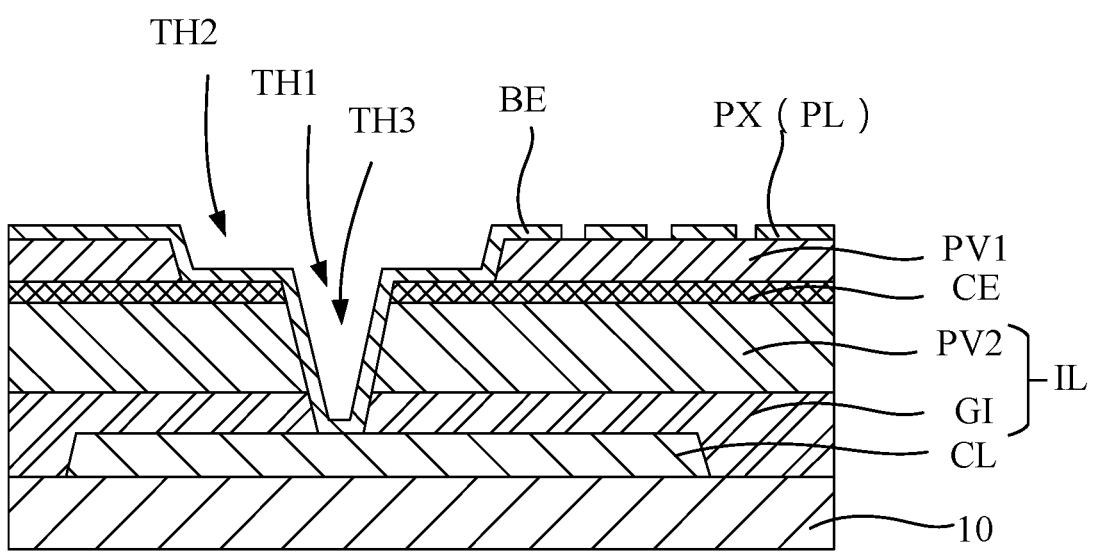
FIG. 3D is a cross-sectional view along line A-A of FIG. 3C.
Figure 3E:
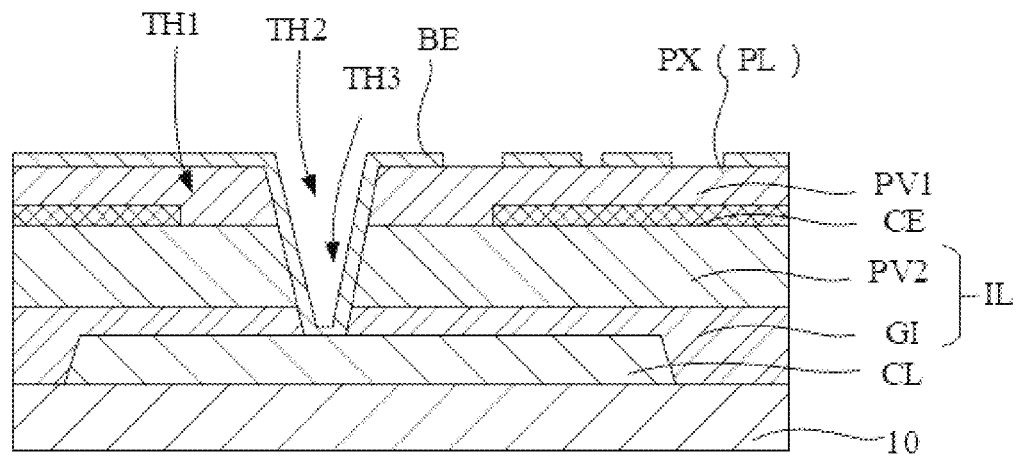
FIG. 3E is a cross-sectional view along line B-B of FIG. 3C.

Refer to FIG. 2, FIG. 3D, and FIG. 3E, an array substrate 100 according to an embodiment of the present application includes a substrate 10 and a plurality of parallel scan lines GL provided on the substrate 10 (only one is shown in the figure), a plurality of data lines DL arranged in parallel (only one is shown in the figure), a plurality of thin film transistors (only one is shown in the figure) T and a plurality of pixel electrodes PX.

The substrate 10 is used to support various components disposed thereon. The substrate 10 may be a rigid substrate 10 such as glass or plastic, or an organic flexible substrate 10.

A plurality of scan lines GL intersect with a plurality of data lines DL to define a plurality of pixel areas. Optionally, the scan lines GL and the data lines DL may intersect perpendicularly. A plurality of thin film transistors T serve as switching elements. The thin film transistor T and a pixel electrode PX are provided in each pixel area. The thin film transistor T includes a gate GE, a source SE, and a drain DE. The gate GE is connected to the scan line GL, the source SE is connected to the data line DL, and the drain DE is connected to the pixel electrode PX.

The array substrate 100 further includes a common electrode line CL, an insulation layer IL, a common electrode CE, a first passivation layer PV1, and a pixel electrode layer PL.

The common electrode line CL is used to provide a common signal to the common electrode CE. The common electrode line CL is provided in the same layer as the gate GE of the thin film transistor T on the array substrate 100. Materials of the common electrode line CL and the gate may be selected from copper (CU), tantalum (Ta), tungsten (W), molybdenum (Mo), aluminum (Al), titanium (Ti) or alloys thereof. The common electrode line CL and the gate GE may be made of a single layer of metal or a multi-layer metal. The multi-layer metal is for example a laminate of copper (CU) and molybdenum (Mo), a laminate of copper (CU) and molybdenum titanium (MoTi) alloy, a laminate of copper (CU) and titanium (Ti), a laminate of aluminum (Al) and molybdenum (Mo), a laminate of molybdenum (Mo) and tantalum (Ta), a laminate of molybdenum (Mo) and tungsten (W), a laminate of molybdenum (Mo)-aluminum (Al)-molybdenum (Mo), etc.

The insulation layer IL covers the common electrode line CL. Optionally, the thin film transistor T in this embodiment is a bottom-gate thin film transistor. The insulation layer IL includes a gate insulation layer GI covering the gate GE and the common electrode line CL, and a second passivation layer PV2 disposed on the gate insulation layer GI. In other embodiments of the present application, depending on the type of the thin film transistor T, the insulation layer IL may also include other film layers. For example, when the thin film transistor T is a top-gate thin film transistor T, the insulation layer IL may include an interlayer insulation layer. The insulation layer IL can be a single layer or a laminate of silicon oxide, silicon nitride, silicon oxynitride, aluminum oxide, titanium oxide, etc.

The common electrode CE is disposed on the insulation layer IL, specifically, on the second passivation layer PV2. The common electrode CE is used to provide a common voltage and form an electric field with the pixel electrode PX to drive the liquid crystal to deflect. The material of the common electrode CE may be indium tin oxide (ITO).

The first passivation layer PV1 covers the common electrode CE. The first passivation layer PV1 may be a single layer or a laminate of silicon oxide, silicon nitride, silicon oxynitride, aluminum oxide, titanium oxide, etc.

The pixel electrode layer PL is disposed on the first passivation layer PV1. The pixel electrode layer PL includes a pixel electrode PX and a bridge electrode BE insulated from the pixel electrode PX.

Refer to FIG. 3A to FIG. 3E, a first through hole TH1 is opened in the common electrode CE, a second through hole TH2 is opened in the first passivation layer PV1, and a third through hole TH3 is opened in the insulation layer IL. That is, the third through hole TH3 simultaneously penetrates the first passivation layer PV1 and the gate insulation layer GI. The third through hole TH3 exposes the common electrode line CL. An orthographic projection of a hole wall of the first through hole TH1 on the substrate 10 is a first orthographic projection O1. An orthographic projection of a hole wall of the second through hole TH2 on the substrate 10 is a second orthographic projection O2. The first orthographic projection O1 and the second orthographic projection O2 partially overlap. Two directions parallel to the surface of the substrate 10 are defined as a first direction D1 and a second direction D2, and the first direction D1 and the second direction D2 intersect. The "surface of the substrate 10" here refers to the surface perpendicular to the thickness direction. In the first direction D1 and/or the second direction D2, at least one end of the second orthographic projection O2 is located outside the first orthographic projection O1, so that the first orthographic projection O1 and the second orthographic projection O2 partially overlap. In other words, in a plan view, as shown in FIG. 3C, the first through hole TH1 and the second through hole TH2 partially overlap. As shown in FIG. 3D and FIG. 3E, the first through hole TH1, the second through hole TH2, and the third through hole TH3 are connected. The bridge electrode BE extends into the first through hole TH1, the second through hole TH2, and the third through hole TH3 to connect with the common electrode CE and the common electrode line CL.

Because there is no common electrode CE blocking the overlapping part of the second through hole TH2 and the first through hole TH1, the underlying insulation layer IL can be etched while etching the first passivation layer PV1, thereby improving the success rate of deep hole formation. In the part where the second through hole TH2 and the first through hole TH1 do not overlap, the common electrode CE is exposed, so that the bridge electrode BE is connected to the common electrode CE and thereby connected to the common electrode line CL.

On the other hand, in FIG. 3D, during the process of etching the first passivation layer PV1, due to the obstruction of the common electrode CE below the passivation layer, etching defects are likely to occur during etching of the insulation layer IL (i.e., the second passivation layer PV2 and the gate insulation layer GI). When a hole is formed on the side wall of the insulation layer IL, and the bridge electrode BE is subsequently formed on the side wall, disconnection may easily occur. In FIG. 3E, because there is no obstruction by the common electrode CE, the first passivation layer PV1 is etched together with the insulation layer IL, so that holes may not be formed on the side walls of the insulation layer IL, thereby preventing subsequent disconnection of the bridge electrode BE.

Further, a length direction of the second orthographic projection O2 is defined as the first direction D1, and the direction perpendicular to the first direction D1 is defined as the second direction D2. It should be noted that the orthographic projection of the first through hole TH1 and the second through hole TH2 on the substrate 10 may be a regular shape such as a rectangle, a rounded rectangle, a square, a circle, an ellipse, etc., or may be other irregular shapes. As shown in FIG. 3B, the length direction of the second orthographic projection O2 is defined as the direction of the line between the two furthest points on the second orthographic projection O2, or any direction parallel to the direction of the line connecting the two furthest points on the second orthographic projection O2. That is, both the first direction D1 and the second direction D2 do not limit their starting point and end point, but only represent their directions. Optionally, the extension direction of the common electrode line CL is defined as the first direction D1, and the direction perpendicular to the first direction D1 is defined as the second direction D2. However, the present application does not limit the specific directions of the first direction D1 and the second direction D2. The first direction D1 may also be any direction intersecting the extending direction of the common electrode CL.

In the first direction D1 and/or the second direction D2, at least one end of the second orthographic projection O2 is located outside the first orthographic projection O1. That is, in the first direction D1 and/or the second direction D2, the orthographic projection of the hole wall of at least one end of the second through hole TH2 on the substrate 10 is located outside the orthogonal projection of the hole wall of the first through hole TH1 on the substrate 10. Therefore, the first passivation layer PV1 may cover the common electrode CE in the first direction D1 and/or the second direction D2. It can be understood that this is based on the premise that the first orthographic projection O1 and the second orthographic projection O2 partially overlap and excludes the situation where the first orthographic projection O1 and the second orthographic projection O2 completely overlap.

When the orthographic projection of the hole wall of at least one end of the second through hole TH2 on the substrate 10 is located outside the orthographic projection of the hole wall of the first through hole TH1 on the substrate 10, the first passivation layer PV1 covers the common electrode CE. When the first passivation layer PV1 is etched, it is not blocked by the underlying common electrode CE, and the underlying insulation layer IL can be etched away together.

Optionally, in this embodiment, in the first direction D1, both ends of the second orthographic projection O2 are located outside the first orthographic projection O1.

In the first direction D1 and/or the second direction D2, at least one end of the first orthographic projection O1 is located outside the second orthographic projection O2. That is, in the first direction D1 and/or the second direction D2, the orthographic projection of the hole wall of at least one end of the first through hole TH1 on the substrate 10 is located outside the orthogonal projection of the hole wall of the second through hole TH2 on the substrate 10. Thereby, the first through hole TH1 exposes the common electrode CE for connection with the bridge electrode BE.

Specifically, the first through hole TH1 and the second through hole TH2 are respectively rectangular or rounded rectangular. The length direction of the first through hole TH1 is one of the first direction D1 and the second direction D2, and the length direction of the second through hole TH2 is another one of the first direction D1 and the second direction D2. As shown in FIG. 3C, the first through hole TH1 is a rounded rectangle, its length direction is the first direction D1, its length is 12 um, its width direction is the second direction D2, and its width is 5.5 um. Further, the first direction D1 is the extending direction of the common electrode line CL. The second through hole TH2 is also a rounded rectangle, its length direction is the second direction D2, the length is 12 um, its width direction is the first direction D1, and its width is 5.5 um. The first through hole TH1 and the second through hole TH2 form a cross when viewed from above. The first through hole TH1 and the second through hole TH2 are both elongated holes, and their extending directions are perpendicular to each other, which facilitates alignment of the two holes and increases the overlapping area. The sizes of the first through hole TH1 and the second through hole TH2 can be designed according to process constraints to ensure the opening ratio.

In the second direction D2, both ends of the second orthographic projection O2 are located outside the first orthographic projection O1, and in the first direction D1, both ends of the first orthographic projection O1 are located outside the second orthographic projection O2. That is, from a plan view, both ends of the first through hole TH1 in the first direction D1 are located outside both ends of the second through hole TH2 in the first direction D1 for bridging. Both ends of the second through hole TH2 in the second direction D2 are located outside the two ends of the first through hole TH1 in the second direction D2, which facilitates deep hole etching.

It can be understood that the present application does not limit the shapes of the first through hole TH1 and the second through hole TH2. The first through hole TH1 and the second through hole TH2 can also be square holes or circular holes.

Figure 4A:
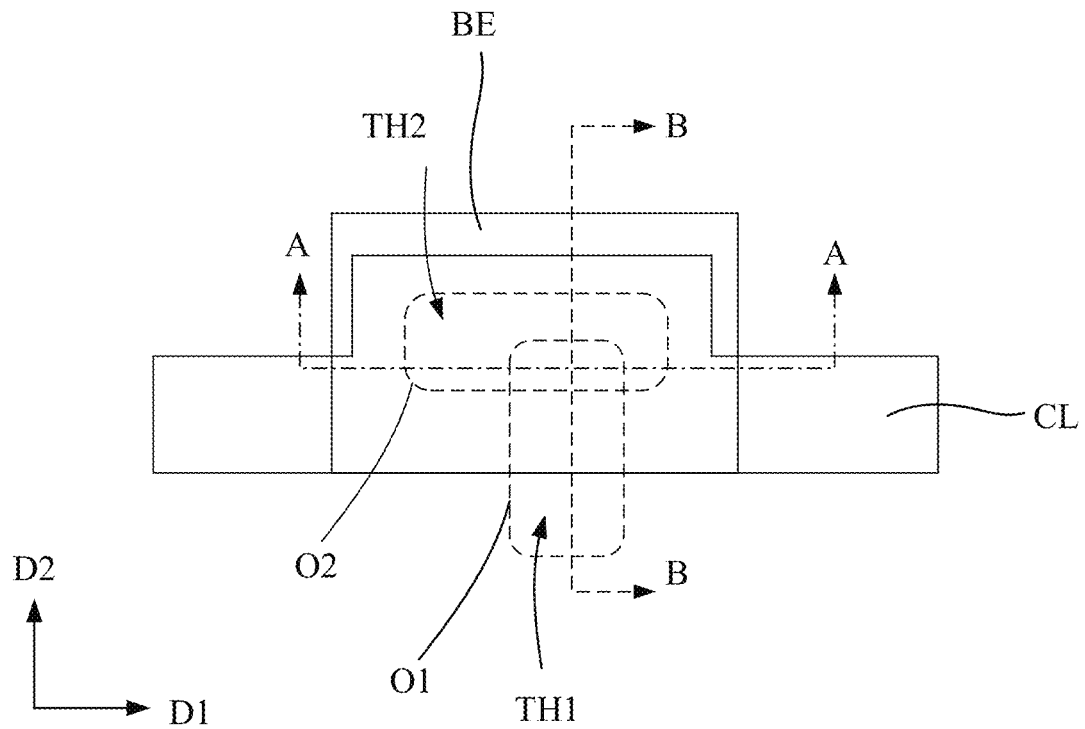
FIG. 4A is a schematic top view of a first through hole and a second through hole of an array substrate according to another embodiment of the present application.
Figure 4B:
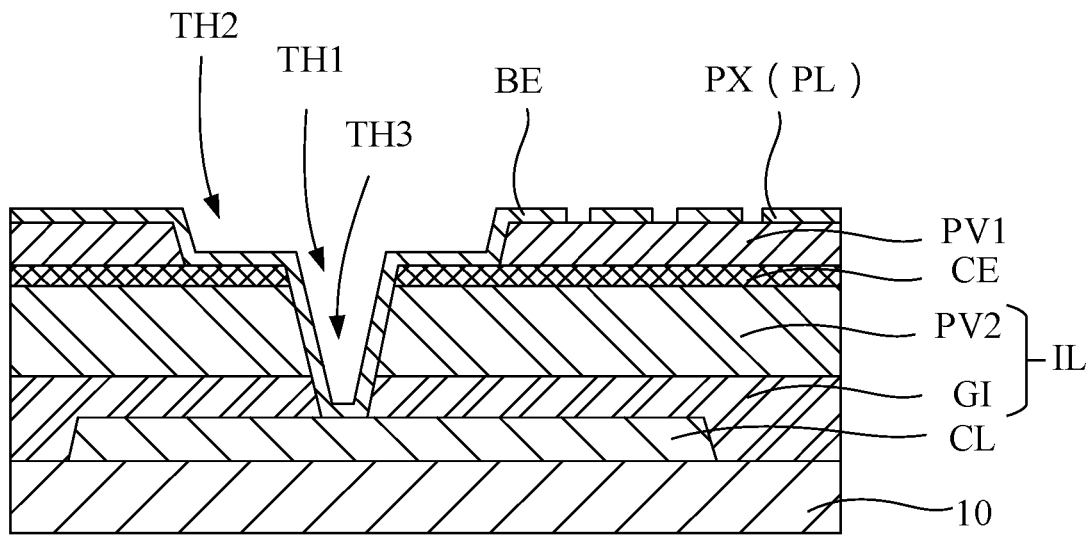
FIG. 4B is a cross-sectional view along line A-A in FIG. 4A.
Figure 4C:
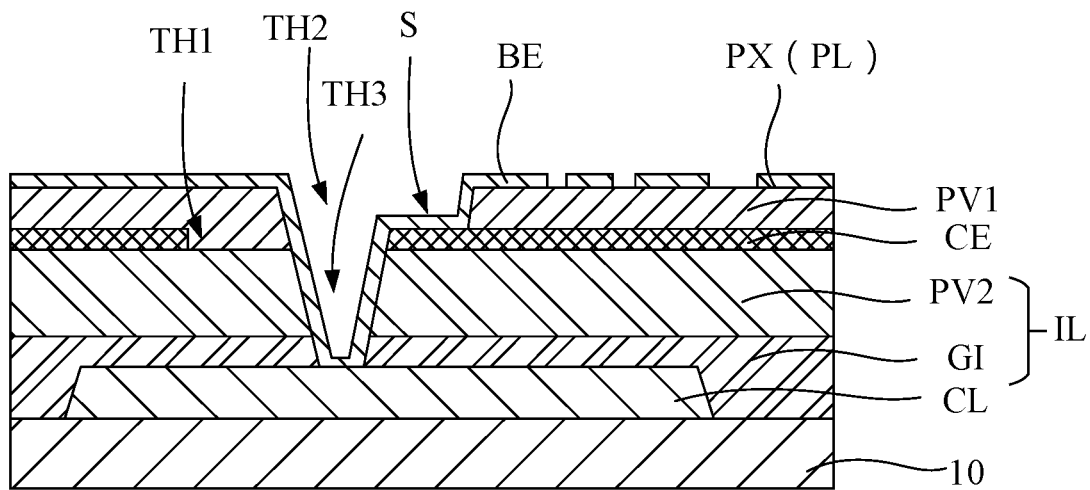
FIG. 4C is a cross-sectional view along line B-B in FIG. 4A.

Refer to FIG. 4A to FIG. 4C, in another embodiment of the present application, in the second direction D2, one end of the second orthographic projection O2 is located outside the first orthographic projection O1, and the other end is located inside the first orthographic projection O1, and in the first direction D1, both ends of the first orthographic projection O1 are located outside the second orthographic projection O2. That is, from a plan view, in the second direction D2, one end of the first through hole TH1 is located outside the second through hole TH2, and the other end is located inside the second through hole TH2. Thereby, the common electrode CE is exposed from the first through hole TH1, and the bridge electrode BE can be connected to the common electrode line CL through the exposed common electrode CE. Moreover, a step S is formed between the first passivation layer PV1 and the common electrode CE. Compared with the side where the step S is not formed, the alignment film flows more easily from the position where the step S is formed, thereby preventing the alignment film from stacking.

It can be understood that in this embodiment, the bridging function can be realized only through the arrangement in the second direction D2, and the success rate of deep hole formation can be improved, thereby solving the technical problem. In other embodiments, the arrangement of the first through hole TH1 and the second through hole TH2 in the first direction D1 is not limited. It is understood that, in this embodiment, the connection reliability of the bridge electrode BE, the common electrode CE, and the common electrode line CL can be increased through the arrangement of the through holes in the first direction D1.

Figure 5A:
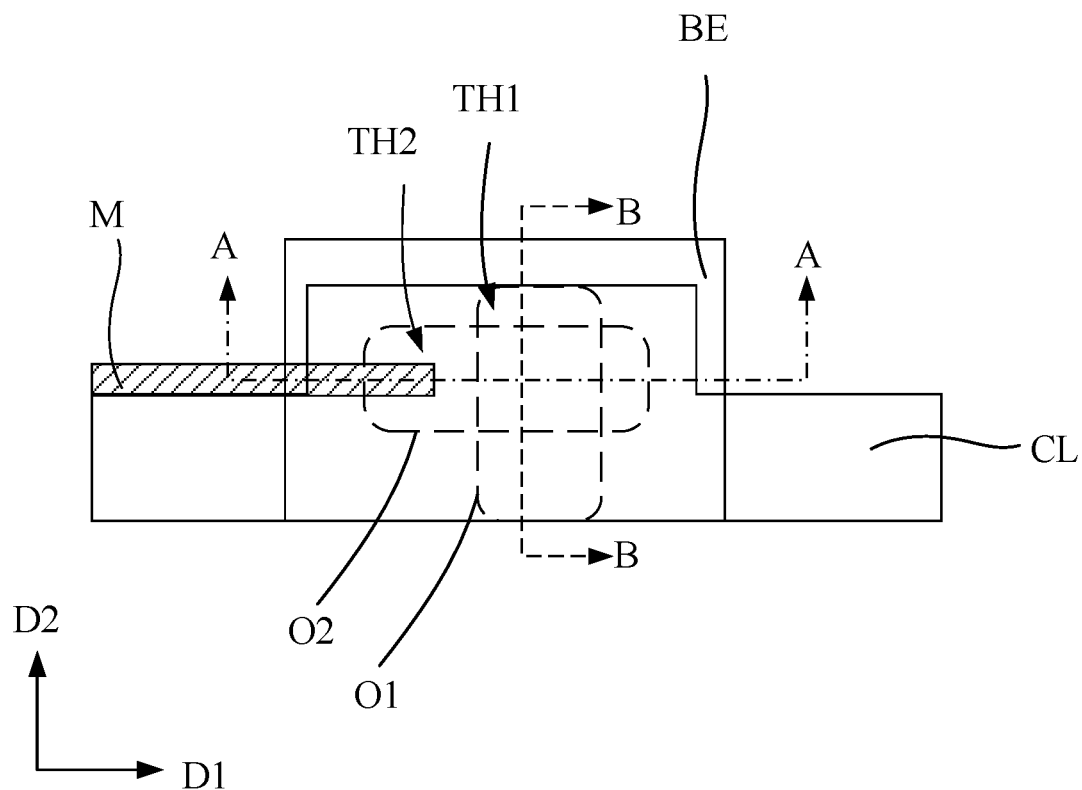
FIG. 5A is a schematic top view of a first through hole and a second through hole of an array substrate according to another embodiment of the present application.
Figure 5B:
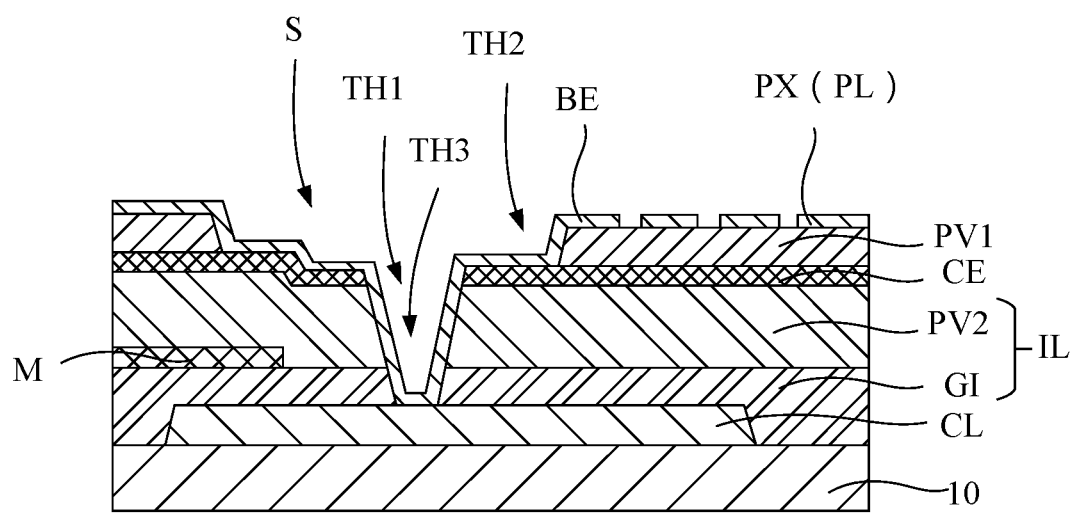
FIG. 5B is a cross-sectional view along line A-A in FIG. 5A.
Figure 5C:
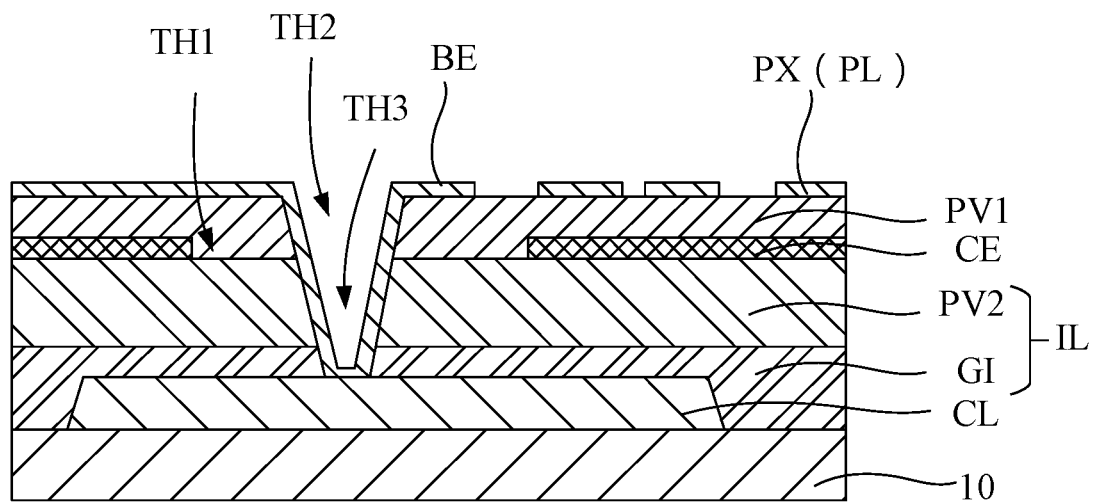
FIG. 5C is a cross-sectional view along line B-B in FIG. 5A.

Refer to FIG. 5A to FIG. 5C, in another embodiment of the present application, the array substrate 100 further includes a pad M, which is disposed between the common electrode line CL and the common electrode CE. Specifically, in the first direction D1 and/or the second direction D2, the orthographic projection of the pad M on the substrate 10 extends from outside the first orthographic projection O1 to between the first orthographic projection O1 and the second orthographic projection O2. When viewed from above, the pad M extends from the position below the first passivation layer PV1 to between the first through hole TH1 and the second through hole TH2. Raise the common electrode CE between the first through hole TH1 and the second through hole TH2, thereby forming a step S on the common electrode CE. Compared with the side where the step S is not formed, the alignment film flows in more easily from the position where the step S is formed, thereby preventing accumulation of the alignment film. Optionally, considering the opening ratio and wiring design, the pad M extends along the first direction D1.

Furthermore, the insulation layer IL in this embodiment includes a gate insulation layer GI and a second passivation layer PV2. The pad M is located between the gate insulation layer GI and the second passivation layer PV2 and can be formed using the same layer of metal of the source SE and the drain DE. It can be understood that the present application does not limit this.

Material of the pad M may be selected from copper (CU), tantalum (Ta), tungsten (W), molybdenum (Mo), aluminum (Al), titanium (Ti) or alloys thereof. The pad M may be made of a single layer of metal or a multi-layer metal. The multi-layer metal is for example a laminate of copper (CU) and molybdenum (Mo), a laminate of copper (CU) and molybdenum titanium (MoTi) alloy, a laminate of copper (CU) and titanium (Ti), a laminate of aluminum (Al) and molybdenum (Mo), a laminate of molybdenum (Mo) and tantalum (Ta), a laminate of molybdenum (Mo) and tungsten (W), a laminate of molybdenum (Mo)-aluminum (Al)-molybdenum (Mo), etc.

The present application further provides a liquid crystal display panel 1. The liquid crystal display panel 1 includes an array substrate 100, a color filter substrate 200, and a liquid crystal layer 300. The array substrate 100 and the color filter substrate 200 are arranged opposite to each other.

The liquid crystal layer 300 is disposed between the array substrate 100 and the color filter substrate 200.

The above provides a detailed introduction to the implementation of the present application. This article uses specific examples to illustrate the principles and implementation methods of the present application. The above description of the embodiments is only used to help understand the present application. In addition, for those skilled in the art, there will be changes in the specific implementation and application scope based on the ideas of the present application. In summary, the contents of this specification should not be construed as limiting the present application.

What is claimed is:

1. An array substrate, comprising:
   a substrate;
   a common electrode line disposed on the substrate;
   a gate insulation layer disposed on the common electrode line;
   a first passivation layer disposed on the gate insulation layer;
   a common electrode disposed on the first passivation layer;
   a second passivation layer disposed on the common electrode; and
   a pixel electrode layer disposed on the second passivation layer,
   wherein the pixel electrode layer comprises a pixel electrode and a bridge electrode insulated from the pixel electrode, a first through hole is opened in the common electrode, a second through hole is opened in the first passivation layer, a third through hole is opened in the gate insulation layer, the third through hole exposes the common electrode line, an orthographic projection of a hole wall of the first through hole on the substrate is a first orthographic projection, an orthographic projection of a hole wall of the second through hole on the substrate is a second orthographic projection, the first orthographic projection partially overlaps the second orthographic projection, the first through hole, the second through hole, and the third through hole are connected with each other, and the bridge electrode extends into the first through hole, the second through hole, and the third through hole to connect with the common electrode and the common electrode line;
   wherein a length direction of the second orthographic projection is defined as a first direction, a direction perpendicular to the first direction is defined as a second direction, and in the first direction and/or the second direction, at least one end of the second orthographic projection is located outside the first orthographic projection; and
   in the second direction, at least one end of the first orthographic projection is located outside the second orthographic projection;
   wherein the array substrate further comprises a metal pad, the metal pad is disposed between a side of the common electrode line away from the substrate and aside of the common electrode closer to the substrate, in the first direction, an orthographic projection of the metal pad on the substrate extends from outside the second orthographic projection into the second orthographic projection but not into the first orthographic projection.

2. The array substrate according to claim 1, wherein in the first direction, both ends of the second orthographic projection are located outside the first orthographic projection; and in the second direction, both ends of the first orthographic projection are located outside the second orthographic projection.

3. The array substrate according to claim 1, wherein the first direction is an extension direction of the common electrode line.

4. The array substrate according to claim 3, wherein the first through hole and the second through hole are respectively rectangular or rounded rectangular, a length direction of the first through hole is the second direction, and a length direction of the second through hole is the first direction.

5. The array substrate according to claim 1, wherein in the first direction and/or the second direction, the first passivation layer covers the common electrode.

6. The array substrate according to claim 1, wherein in the first direction and/or the second direction, the first through hole exposes the common electrode.

7. A liquid crystal display panel, comprising:
an array substrate comprising:
a substrate;
a common electrode line disposed on the substrate;
a gate insulation layer disposed on the common electrode line;
a first passivation layer disposed on the gate insulation layer;
a common electrode disposed on the first passivation layer;
a second passivation layer disposed on the common electrode; and
a pixel electrode layer disposed on the second passivation layer,
wherein the pixel electrode layer comprises a pixel electrode and a bridge electrode insulated from the pixel electrode, a first through hole is opened in the common electrode, a second through hole is opened in the first passivation layer, a third through hole is opened in the gate insulation layer, the third through hole exposes the common electrode line, an orthographic projection of a hole wall of the first through hole on the substrate is a first orthographic projection, an orthographic projection of a hole wall of the second through hole on the substrate is a second orthographic projection, the first orthographic projection partially overlaps the second orthographic projection, the first through hole, the second through hole, and the third through hole are connected with each other, and the bridge electrode extends into the first through hole, the second through hole, and the third through hole to connect with the common electrode and the common electrode line;
wherein a length direction of the second orthographic projection is defined as a first direction, a direction perpendicular to the first direction is defined as a second direction, and in the first direction, at least one end of the second orthographic projection is located outside the first orthographic projection; and
in the second direction, at least one end of the first orthographic projection is located outside the second orthographic projection;
wherein the array substrate further comprises a metal pad, the metal pad is disposed between a side of the common electrode line away from the substrate and a side of the common electrode closer to the substrate, in the first direction, an orthographic projection of the metal pad on the substrate extends from outside the second orthographic projection into the second orthographic projection but not into the first orthographic projection.

8. The array substrate according to claim 7, wherein in the first direction, both ends of the second orthographic projection are located outside the first orthographic projection; and
in the second direction, both ends of the first orthographic projection are located outside the second orthographic projection.

9. The liquid crystal display panel according to claim 7, wherein the first direction is an extension direction of the common electrode line.

10. The liquid crystal display panel according to claim 9, wherein the first through hole and the second through hole are respectively rectangular or rounded rectangular, a length direction of the first through hole is the second direction, and a length direction of the second through hole is the first direction.

\* \* \* \* \*